(12) United States Patent
Alstrin (10) Patent No.: US 11,079,308 B2
(45) Date of Patent: Aug. 3, 2021

(54) CONTINUOUS DETERMINATION OF MEDIUM STIFFNESS AND LOAD GAIN FOR ADAPTIVE ACTUATOR CONTROL

(71) Applicant: Waters Technologies Corporation, Milford, MA (US)

(72) Inventor: Kevin Alstrin, Excelsior, MN (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 277 days.

(21) Appl. No.: 16/149,615

(22) Filed: Oct. 2, 2018

(65) Prior Publication Data
US 2019/0107471 A1 Apr. 11, 2019

Related U.S. Application Data

(60) Provisional application No. 62/569,800, filed on Oct. 9, 2017.

(51) Int. Cl.
*G01N 3/02* (2006.01)
*G01N 3/00* (2006.01)
(Continued)

(52) U.S. Cl.
CPC ............. *G01N 3/02* (2013.01); *G01N 3/00* (2013.01); *G01N 3/32* (2013.01); *G01N 3/08* (2013.01);
(Continued)

(58) Field of Classification Search
CPC ..... G01N 2203/0012; G01N 2203/005; G01N 2203/0208; G01N 2203/0676; G01N 3/00; G01N 3/02; G01N 3/08; G01N 3/32
See application file for complete search history.

(56) References Cited

U.S. PATENT DOCUMENTS 3,784,798 A 1/1974 Beadle et al.
3,836,757 A 9/1974 Nachtigal et al.
(Continued)

FOREIGN PATENT DOCUMENTS

CN 2682407 Y 3/2005
EP 2522980 A2 11/2012
(Continued)

OTHER PUBLICATIONS

International Preliminary Report on Patentability in PCT/US2018/05925 dated Apr. 23, 2020.
(Continued)

*Primary Examiner* — Roy Y Yi
*Assistant Examiner* — Geoffrey T Evans
(74) *Attorney, Agent, or Firm* — Schmeiser, Olsen & Watts LLP (57) ABSTRACT

An actuator control system, mechanical testing system, and method for adaptive control of an actuator of a mechanical testing device may include determining a stiffness of a medium that the actuator is moving through and/or load gain of the actuator, wherein the stiffness and load gain is determined by generating a waveform to actuate the actuator until a load sensor signal and/or a displacement sensor signal is received, and controllably moving the actuator through the medium according to a predefined constant velocity by calculating a current request using the stiffness of the medium, and/or adjusting the load of the actuator in accordance with a constant load ramp rate.

15 Claims, 9 Drawing Sheets

(51) Int. Cl.
*G01N 3/32* (2006.01)
*G01N 3/08* (2006.01)

(52) U.S. Cl.
CPC ............. *G01N 2203/005* (2013.01); *G01N 2203/0012* (2013.01); *G01N 2203/0208* (2013.01); *G01N 2203/0676* (2013.01)

(56) References Cited

U.S. PATENT DOCUMENTS

| | | | |
|---|---|---|---|
| 5,431,062 | A | 7/1995 | Baratta |
| 9,495,038 | B2 | 11/2016 | Young |
| 9,562,960 | B2 | 2/2017 | Kolipaka et al. |
| 2004/0020276 | A1* | 2/2004 | Kwon .................. G01N 3/48 73/81 |
| 2005/0120802 | A1 | 6/2005 | Schulz |
| 2005/0267695 | A1* | 12/2005 | German .................. G01N 3/30 702/41 |
| 2010/0280787 | A1 | 11/2010 | White et al. |
| 2011/0092798 | A1 | 4/2011 | Kolipaka et al. |
| 2011/0288791 | A1 | 11/2011 | Jeppesen et al. |
| 2012/0131702 | A1* | 5/2012 | Shi .................. G01Q 10/065 850/1 |
| 2014/0345358 | A1 | 11/2014 | White et al. |
| 2016/0224158 | A1 | 8/2016 | Young |
| 2016/0274142 | A1 | 9/2016 | White et al. |
| 2019/0107472 | A1* | 4/2019 | Alstrin .................. G01N 3/32 |

FOREIGN PATENT DOCUMENTS

| | | |
|---|---|---|
| GB | 2282228 A | 3/1995 |
| GB | 2467184 A | 7/2010 |
| WO | 2007004993 A1 | 1/2007 |

OTHER PUBLICATIONS

International Preliminary Report on Patentability in PCT/US2018/053899 dated Apr. 16, 2020.
International Preliminary Report on Patentability in PCT/US2018/053912 dated Apr. 23, 2020.
Farsi, et al. "Full deflection profile calculation and Young's modulus optimization for engineered high performance materials," Scientific Reports, Apr. 11, 2017.
Non-Final Office Action in U.S. Appl. No. 16/149,546 dated Nov. 25, 2020.
Plummer, A.R. "Control techniques for structural testing: a review," Proceedings of the Institution of Mechanical Engineers, Journal of Engineering in Medicine, Mar. 1, 2007, vol. 221, No. 2, pp. 139-169.
International Search Report & Written Opinion in PCT/US2018/053899 dated Jan. 17, 2019; 15 pages.
International Search Report & Written Opinion in PCT/US2018/053912 dated Jan. 22, 2019; 13 pages.
Final Office Action in U.S. Appl. No. 16/149,546 dated Apr. 15, 2021.
Non-Final Office Action in U.S. Appl. No. 16/149,695 dated Jan. 26, 2021.
Notice of Allowance in U.S. Appl. No. 16/149,695 dated May 12, 2021.

* cited by examiner

CONTINUOUS DETERMINATION OF MEDIUM STIFFNESS AND LOAD GAIN FOR ADAPTIVE ACTUATOR CONTROL

RELATED APPLICATION

This application claims the benefit of the earlier filing date of U.S. Provisional Patent Application No. 62/569,800, filed Oct. 9, 2017 and titled "Continuous Determination of Medium Stiffness and Load Gain for Adaptive Actuator Control," the entirety of which is incorporated herein by reference.

TECHNICAL FIELD

The present invention relates to a mechanical testing system and methods for actuator control, and more specifically to embodiments of an actuator control system for adaptive control of an actuator using medium stiffness characterization data and load gain to maintain a uniform ramp rate of the actuator's displacement and load.

BACKGROUND

Mechanical testing systems are used for calculating, testing, and measuring material properties and parameters of various specimens. Arbitrary, controlled actuator movements occur when a user sets up for a test or when a user tears down the machine after a test.

SUMMARY

An aspect relates generally to a method for adaptive control of an actuator of a mechanical testing device, the method comprising: determining a stiffness of a medium that the actuator is moving through, wherein the stiffness is determined by generating an actuator current waveform to actuate the actuator until a displacement sensor signal is received, and controllably moving the actuator through the medium according to a predefined constant velocity by calculating a current request using the stiffness of the medium.

Another aspect relates generally to a method for adaptive control of an actuator of a mechanical testing device, the method comprising: determining a load gain of the actuator, wherein the load gain is determined by generating an actuator current waveform to actuate the actuator until a load sensor signal is received, and controllably moving the actuator through the medium according to a predefined constant load ramp rate by calculating a current request using the stiffness of the medium.

Further aspects relate to a method, a mechanical testing system, and a computer program product for determining a compensated value attributable to a deflection of the mechanical testing system, the method comprising: generating, by a processor of a computing system of the mechanical testing system, an actuator motor current waveform for actuating an actuator until a load sensor signal and a displacement sensor signal is received from a load sensor and a displacement sensor, respectively, obtaining, by the processor, stiffness characterization data of a medium that the actuator is moving through and a load gain of the actuator, as a function of generating the waveform, determining, by the processor, a position error by comparing a desired position of the actuator input by a user operating the mechanical testing system with an actual position of the actuator, and a load error by comparing a desired load of the actuator with an actual load of the actuator, calculating, by the processor, a current request using the stiffness characterization data, the position error, and the load error, and controlling, by the processor, a movement and a load of the actuator using the current request to achieve the desired position and desired load while maintaining both a uniform velocity and uniform load ramp rate.

DETAILED DESCRIPTION

For many pre-test and post-test operations related to dynamic mechanical analysis (DMA) machines, a user may need to move an actuator of the machine to install or remove a test specimen, install new fixtures, adjust a grip of the fixture, etc. (e.g. "utility moves"). During the actuator movements, the actuator may come into contact or out-of-contact with a test specimen or some other rigid boundary or component of the machine. As such, the stiffness and damping properties of the actuator positioning system can unpredictable and can vary widely. A user may also need to maintain a specific actuator position or a specific load as an environmental chamber of the DMA machine reaches a desired condition. Similarly, a stiffness and damping properties of the test material can vary greatly while an ambient temperature is being increased or decreased to a desired point before commencing a test. Controlling the test system actuator to apply the prescribed load and displacement profile when the test specimen dynamics are unknown and varying can be challenging.

Methods relating to actuator movement during "utility moves" of a test system actuator for test setup/teardown involve ramping the actuator motor current at a predefined rate until the desired displacement or load is reached, at which point the actuator motor current can be held at the value when the threshold was reached. This approach leads to significant variability in a resulting load or displacement ramp rate due to a variability in the compliance (i.e. 1/stiffness) of the medium that the actuator is moving against. For example, if the actuator is moving in free air or a very soft medium, the compliance and a displacement ramp rate are greater, while the load ramp rate is smaller for the predetermined motor current ramp rate. Alternatively, if the actuator suddenly makes contact with a rigid component, such as a test specimen, the compliance will decrease and the displacement ramp rate will be smaller, while the load ramp rate is greater for the predetermined motor current ramp rate. Unpredictable or abrupt actuator movements are undesirable to users of the test system.

Alternative methods relating to actuator movement during "utility moves" of a test system actuator for test setup/teardown use a separate dynamic characterization routine at a beginning of the test to obtain actuator control parameters. The separate dynamic characterization routine may put unwanted duty cycles on the test specimen and the characterization may only be valid under the set of conditions the characterization was run. For example, if the characterization was run with the actuator out-of-contact with the test specimen, then the derived control parameters may result in unstable or unacceptable waveform tracking performance when the actuator comes into contact with the test specimen. If the characterization was run with the actuator in contact with the test specimen, the derived control parameters may result in unstable or unacceptable waveform tracking performance after a change in ambient temperature or to the amount of preload or if the actuator moves out of contact with the test specimen.

Moreover, implementing a state feedback controller with static (e.g. constant) control gains to control the actuator is difficult because a DMA machine computer has no knowledge of a stiffness of the specimen that a user may insert, pre-defined control gains can result in very slow control response if the specimen is soft or could result in overactive or unstable control response if the specimen is stiff, the stiffness of the specimen can vary greatly over a temperature range of the test, and pre-defined control gains could result in very slow control response when the specimen is hot or could result in overactive or unstable control response when the specimen is cold. Prior to the start of or upon completion of a DMA test, a test operator may move the actuator around or hold the actuator in a fixed position to setup for a new test or tear down after the DMA test.

Thus, a need exists for embodiments of an actuator control system for adaptive control of an actuator using medium stiffness characterization data to maintain a uniform ramp rate of the actuator. Embodiments of an adaptive actuator control system may maintain a uniform load ramp rate and/or uniform displacement ramp rate for "utility movements" regardless of the medium that the actuator is working against. For instance, embodiments of the adaptive actuator control system may include recursive adjustments to continuously drive the actuator towards a desired load or displacement set point similar to a closed-loop integral control compensation. The control methodology could be described as an integral controller with an adaptive integral gain based on the measured compliance of the medium. Characterizing the compliance or stiffness of the medium may be accomplished by a small signal (e.g. carrier waveform) as described in greater detail infra.

Figure 1:
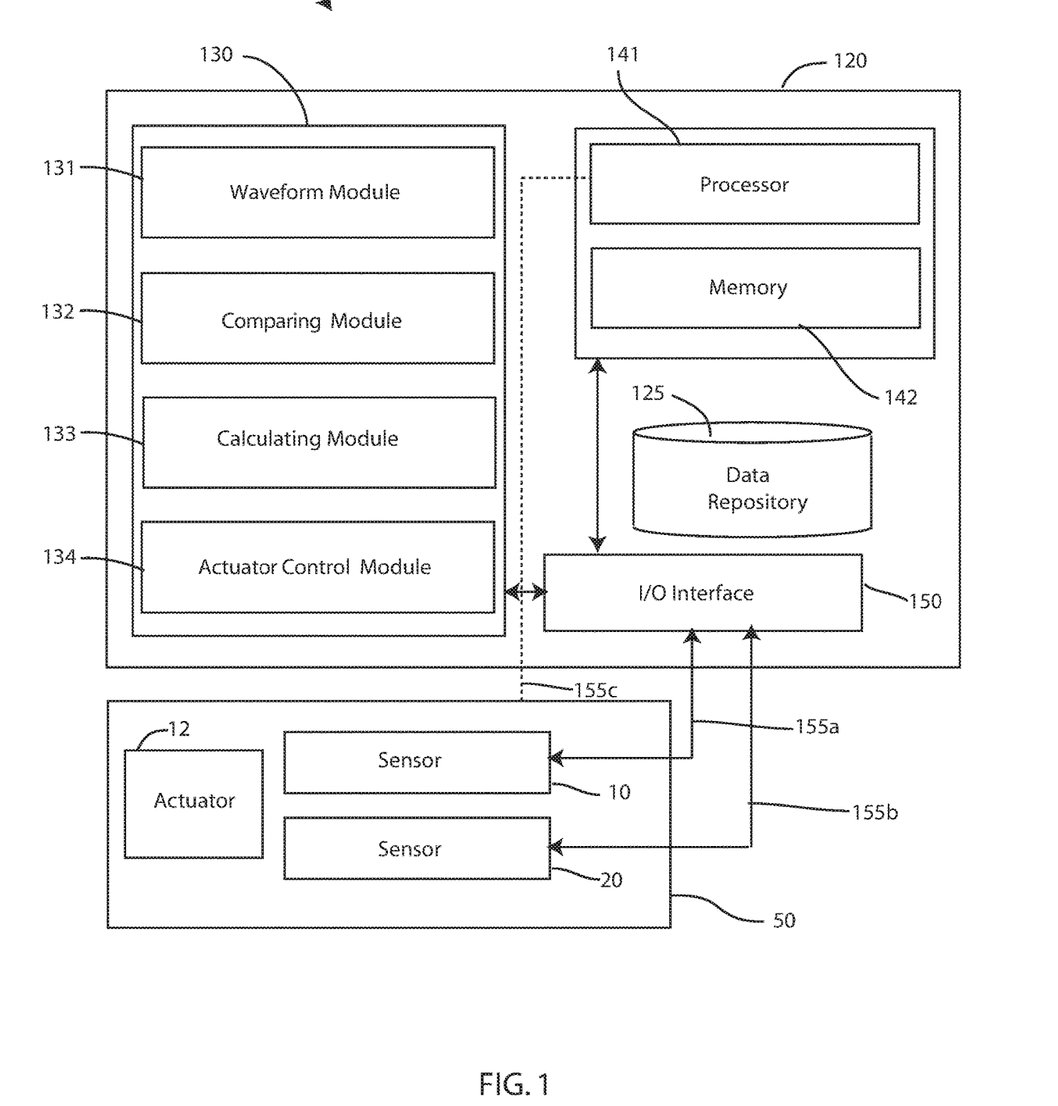
FIG. 1 depicts a block diagram of an actuator control system, in accordance with embodiments of the present invention.

Referring to the drawings, FIG. 1 depicts a block diagram of an actuator control system 100, in accordance with embodiments of the present invention. Embodiments of the actuator control system 100 may be a system for adaptive control of an actuator 12 of a mechanical testing device 50 using medium stiffness characterization data to maintain a uniform ramp rate of the actuator 12. Embodiments of the actuator control system 100 may be useful for ensuring smooth movements of the actuator 12 during pre-test and post-test operations, by taking into account the medium that the actuator 12 is working against or moving through as the actuator 12 is being or about to be displaced. For example, the actuator 12 of the mechanical testing system 50 may be positioned in free air or may be in contact with a rigid component, such as a test sample, at a time of a desired actuator position change. Depending on a stiffness of the medium (e.g. air, liquid, test specimen, and the like), the response/control of the actuator can be adjusted to maintain a constant, uniform, ramp rate (e.g. a velocity of the actuator 12) to achieve a desired actuator position from a current actuator position.

Embodiments of the actuator control system 100 may be a dynamic mechanical analysis system with adaptive actuator control, an adaptive actuator control system, a medium stiffness characterization system, and the like. Embodiments of the actuator control system 100 may include a computing system 120 and a mechanical testing device 50. Embodiments of the computing system 120 may be a computer system, a computer, personal computer, a desktop computer, a cellular phone, a user mobile device, a user computing device, a tablet computer, a dedicated mobile device, a laptop computer, a dedicated processor or microcontroller hardware, other internet accessible device or hardware and the like capable of being coupled to a mechanical testing device 50. Embodiments of the computing system 120 may include hardware functionality such as a speaker for emitting a sound, a display for displaying various plots, graphs, etc., with the ability to flash the display or portions of the content being displayed, a light emitting element for emitting a light, a receiver for receiving communications, a transmitter for transmitting signals, and other similar features and hardware of a computer associated with mechanical testing systems.

Figure 2:
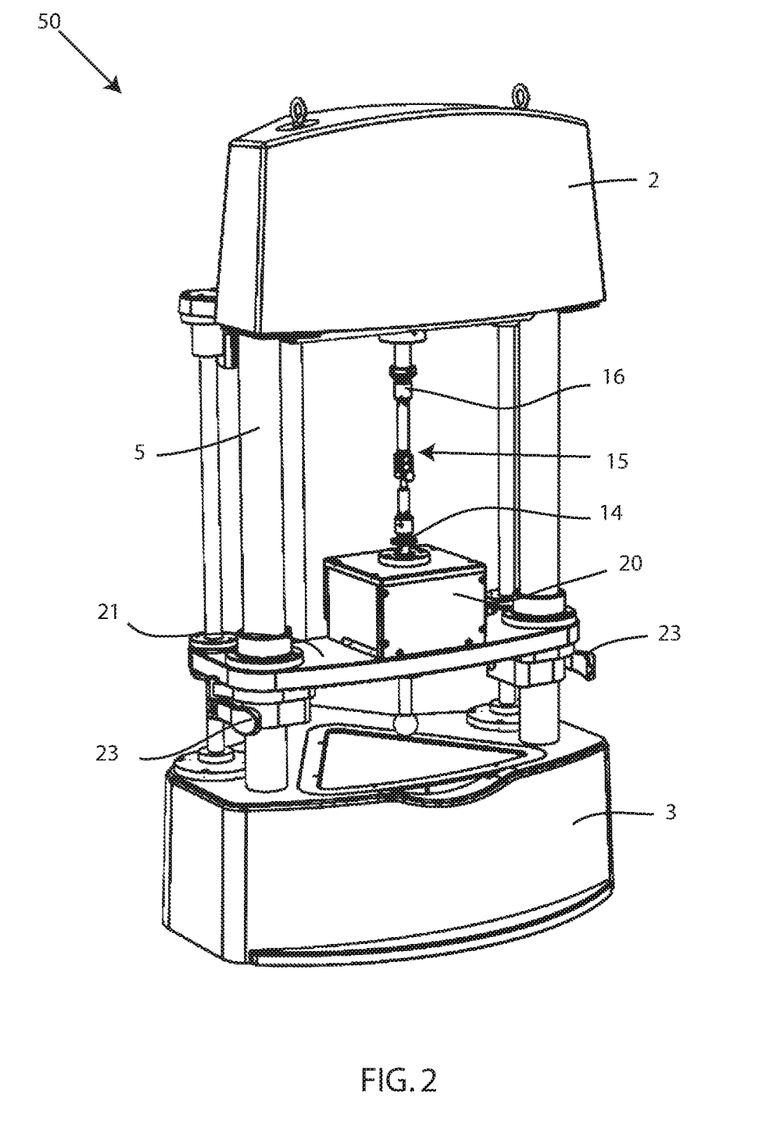
FIG. 2 depicts a perspective view of a mechanical testing device, in accordance with embodiments of the present invention.

Embodiments of the actuator compensation system 100 may include a mechanical testing device 50, coupled to the computing system 120. FIG. 2 depicts a perspective view of a mechanical testing device 50, in accordance with embodiments of the present invention. Embodiments of mechanical testing device 50 may be a mechanical testing system a testing device, a DMA machine, a sample tester, a properties analyzer for various specimens, a test instrument, a mechanical testing instrument, a device for testing samples, or any device for testing, measuring, and/or calculating a physical property, parameter, or characteristic of a physical specimen or section of material. In an exemplary embodiment, the mechanical testing device 50 may be used for calculating a stiffness of a particular sample. Moreover, embodiments of the mechanical testing device 50 may include a frame 5, which may be a general support structure of the mechanical testing device 50. The frame 5 may include an upper housing 2 and a lower housing 3. The actuator 12 may be positioned within the upper housing 3 to apply mechanical load on a specimen 15. Embodiments of the actuator 12 may be an electromagnetic motor, pneumatic actuator, hydraulic actuator, a screw driven linear actuator, and the like. Loading modes may be axial or torsional. A first sensor 10 (as depicted schematically in FIG. 1) may also be positioned within the upper housing 2. For instance, the first sensor 10 may be a displacement sensor that measures a displacement of the actuator 12 during application of a load over a given period of time. Embodiments of the first sensor 10 may be communicatively coupled to the computing system 120, as described in greater detail infra.

Further, embodiments of the mechanical testing device 50 may include a first fixture 16 and a second fixture 14 positioned between the upper housing 2 and the lower housing 2. Embodiments of the first fixture 16 and the second fixture 14 may be a fixture, a holder, a grip, a sample or specimen retention element, a sample/specimen holder, and the like, for securing the ends of reference specimen or sample 15 disposed between the fixtures 16, 14. A distance between the fixtures 16, 14 may be adjusted to secure the sample 15 between the fixtures 16, 15, by manipulating one or more clamps 23 to raise or lower a stage 21 of the mechanical testing device 50. Embodiments of the mechanical testing device 50 may also include a second sensor 20. Embodiments of the second sensor 20 may be a load sensor for measuring a force of an applied load by the actuator 12 over a given period of time. Embodiments of the second sensor 10 may be communicatively coupled to the computing system 120, as described in greater detail infra. In an exemplary embodiment, the second sensor 20 may be positioned below the second fixture, as shown in FIG. 2. However, embodiments of the second sensor 20 may be positioned above the first fixture 16.

Referring back to FIG. 1, embodiments of the mechanical testing device 50 may be communicatively coupled to the computing system 120. For instance, the mechanical testing device 50 may be coupled to a processor 141 of the computing system 120. Sensors 10, 20 of the mechanical testing device 50 may be communicatively coupled to the computing system 120 via an I/O interface 150. The sensors 10, 20 may be connected via an I/O interface 150 to computer system 120. The number of sensors 10, 20 connecting to computer system 120 via data bus lines 155a, 155b (referred to collectively as "data bus lines 155) may vary from embodiment to embodiment, depending on the parameters of a specimen or testing system being tested. As shown in FIG. 1, sensors 10, 20 (e.g. a displacement sensor 10 and load sensor 20) may transmit data or signals (e.g. "feedback data") received from the sensors 10, 20 by connecting to computing system 120 via the data bus lines 155 to an I/O interface 150. An I/O interface 150 may refer to any communication process performed between the computer system 120 and the environment outside of the computer system 120, for example, the sensors 10, 20 and mechanical testing device 50 via data bus line 155c. Input to the computing system 120 may refer to the signals or instructions sent to the computing system 120, for example the data signals collected by the sensors 10, 20, while output may refer to the signals sent out from the computer system 120 to the mechanical testing device 50, such as a signal (e.g. waveform) to actuate the actuator/motor of the mechanical testing device 50.

Furthermore, embodiments of the computing system 120 may be equipped with a memory device 142 which may store various data/information/code, and a processor 141 for implementing the tasks associated with the actuator control system 100. In some embodiments, an actuator control application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the actuator control application 130. Embodiments of the actuator control application 130 may be an interface, an application, a program, a module, or a combination of modules. In an exemplary embodiment, the actuator control application 130 may be a software application running on one or more back end servers, servicing a user personal computer over a network (not shown), and/or may be a software application running on the user personal computing device, or dedicated computing device for DMA machines.

The actuator control application 130 of the computing system 120 may include a waveform module 131, a comparing module 132, a calculating module 133, and an actuator control module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the waveform module 131 may include one or more components of hardware and/or software program code for generating a motor current waveform for actuating an actuator 12 until a load sensor signal and a displacement sensor signal is received from a load sensor and a displacement sensor, respectively. For instance, embodiments of the waveform module 131 may determine a stiffness of a medium that the actuator is moving through by generating a waveform for actuating the actuator 12. Embodiments of the waveform may be a motor current waveform, a carrier waveform, and the like. In an exemplary embodiment, the waveform generated by the waveform module 131 of the computing system 120 may be a carrier waveform having a frequency between 3 Hz-10 Hz. The waveform may be a small signal on top of a user's desired movements or held positions of the actuator 12, that could be made small enough so that the small signal (i.e. motor current waveform) is imperceptible and unperceivable, yet large enough to provide a dynamic characterization suitable for the derivation of adaptive control parameters, such as a stiffness of a medium. Further, embodiments of the waveform may be a periodic waveform, such as a small amplitude sine, triangle, or square waveform. In other embodiments, the waveform may be a small amplitude noise signal where stiffness can be calculated using a transfer function, such as a Fourier Transform of Fast Fourier Transform (FFT). Embodiments of the waveform module 131 may generate the motor current waveform periodically, over a period of time. For instance, the waveform module 131 may generate the waveform at a rate that s short enough to give several updates per movement at a desired ramp rate, yet is long enough to allow for the collection of enough data to obtain a reliable stiffness characterization. In an exemplary embodiment, the waveform may be generated at least 3 times per second. Stated differently, the stiffness of the medium may be periodically characterized over at an update rate for an update period, such as at least 3 times per second, such that the medium stiffness is being determined almost continuously. In other embodiments, the update rate may be faster or slower than 3 times per second Embodiments of the waveform generated by the waveform module 131 may be a current request from the computing system 120 associated with the waveform to be converted into a voltage and/or current to be applied to the actuator 12. Current applied to the actuator 12 in accordance with the current request associated small signal, carrier waveform may then actuate the actuator 12. For example, embodiments of the waveform module 131 may increase an amplitude of current applied to the actuator until the computing system 120 perceives, measures, receives, etc. a corresponding displacement signal from the displacement sensor 10 and a load sensor signal from the load sensor 20. Because of the characteristics of the waveform generated by the waveform module 131, the actuation of the actuator 12, while resulting in data being returned from the displacement sensor 10 and the load sensor 20, may not result in a user-perceptible movement or displacement of the actuator 12.

Figure 3A:
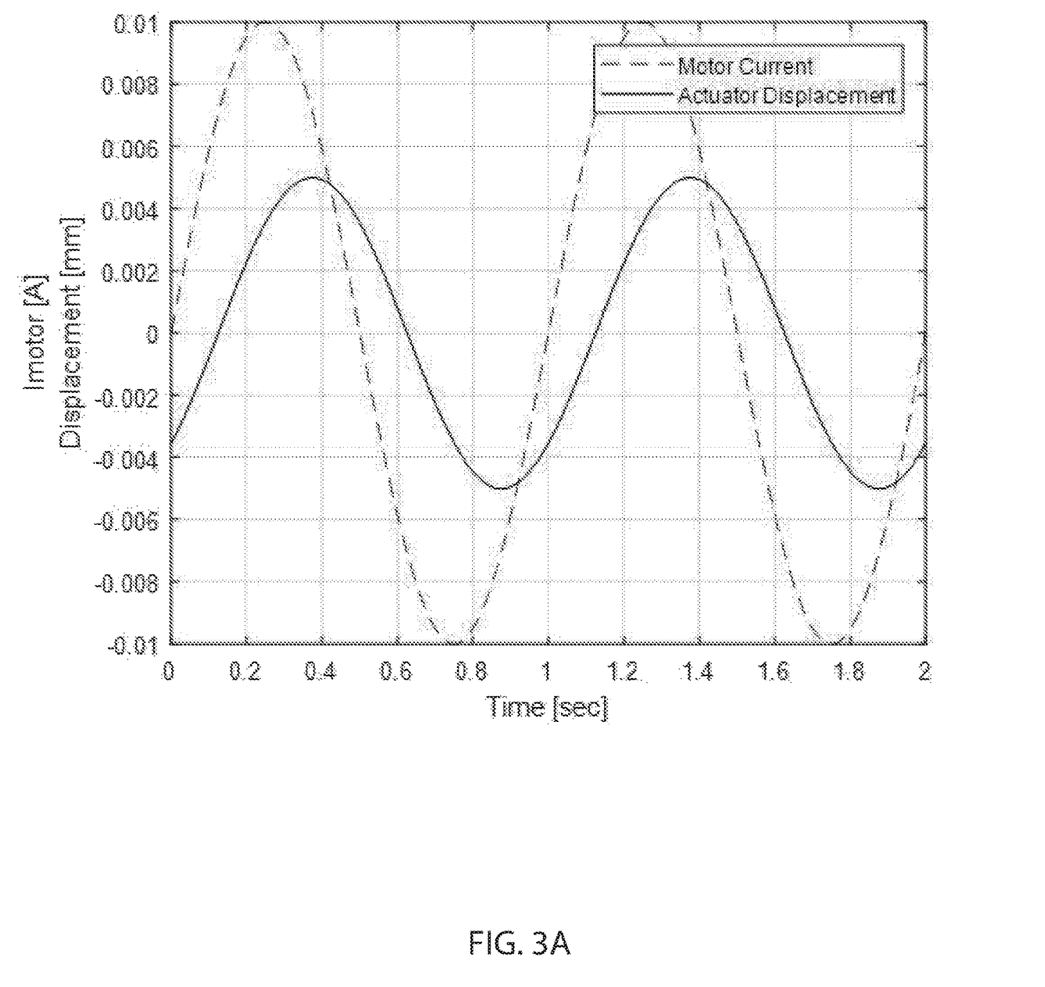
FIG. 3A depicts a graph representing a displacement signal, having an amplitude, in accordance with embodiments of the present invention.

The load sensor signal and the displacement sensor signal can be used by the waveform module 131 to calculate or otherwise determine a stiffness of the medium the actuator 12 is passing through or in a path of the actuator 12. In other words, embodiments of the waveform module 131, by generating a waveform to actuate the actuator may obtain stiffness characterization data of a medium that the actuator is moving through, as a function of generating the waveform. Embodiments of the stiffness characterization data may include a ratio of a load amplitude to an amplitude of a current request associated with the waveform, a ratio of a displacement amplitude to an amplitude of the current request associated with the waveform, or a gain equal to a slope of a force measured by the load sensor and a displacement measured by the displacement sensor, all of which may be obtained from analyzing the load sensor signal and the displacement sensor signal. The stiffness characterization data may be used to calculate a stiffness value (e.g. N/m or $I_{motor}$/m) of a medium working against the actuator 12 (e.g. the medium immediately surrounding an end of the actuator 12). The force constant characterization data may be used to calculate a load gain value (e.g. N/$I_{request}$) of the actuator 12. Using the values from the load sensor signal and/or the displacement sensor signal, the stiffness of the medium and the force gain of the actuator may be calculated using different formulas/methods, depending on whether the actuator 12 is in motion during the application of the waveform, or whether the actuator 12 is stationary during application of the waveform. If the actuator 12 is stationary at the time the waveform/current request is applied as current to the actuator 12, then a dithering technique may be utilized to determine stiffness. For example, dithering may occur at a small amplitude via the waveform to arrive at a ratio of two amplitudes, the two amplitudes being an amplitude of the displacement signal to an amplitude (e.g. amps (A) or milliamps (ma)) of the current request for the dithering (e.g. of the waveform). FIG. 3A depicts a graph representing a displacement signal, having an amplitude, in accordance with embodiments of the present invention. Here, the stiffness may be determined from the amplitude (0.005 mm) of the displacement signal to the amplitude of the current request (0.01 A) associated with the waveform.

Figure 3B:
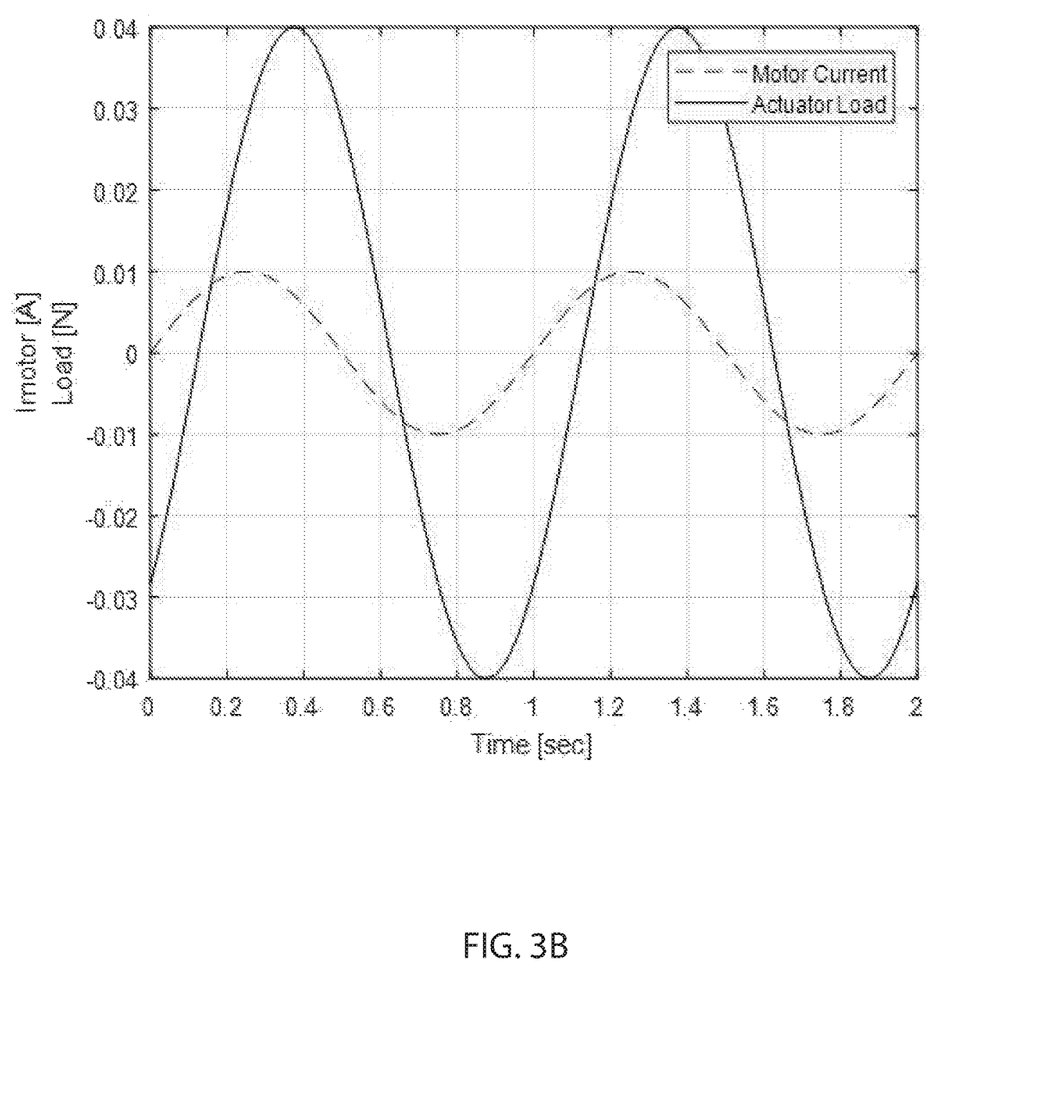
FIG. 3B depicts a graph representing a load signal, having an amplitude, in accordance with embodiments of the present invention.

Similarly, dithering may occur at a small amplitude via the waveform to arrive at a ratio of an amplitude of the load signal (N) to an amplitude of the current request for the dithering (e.g. of the waveform). FIG. 3B depicts a graph representing a load signal, having an amplitude (0.04 N), in accordance with embodiments of the present invention. Here, the stiffness may be determined from the amplitude (0.04 N) of the load signal to the amplitude of the current request (0.01 A) associated with the waveform.

Figure 3C:
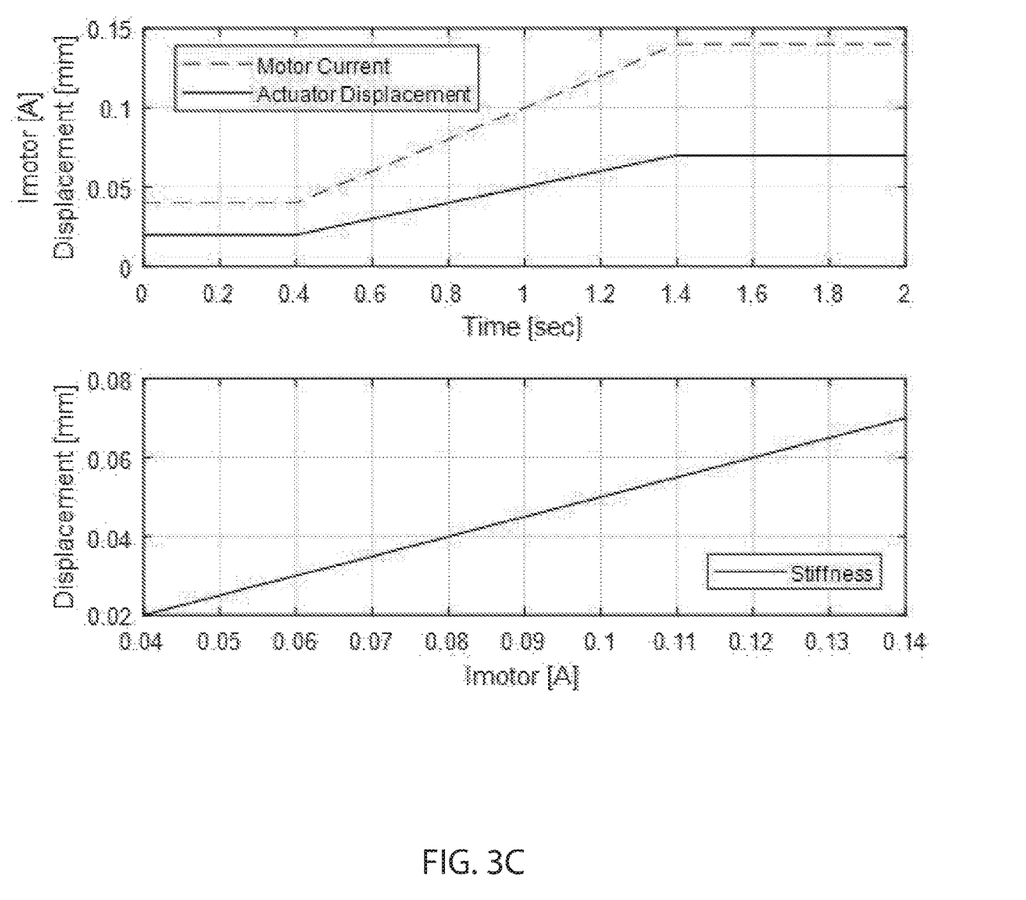
FIG. 3C depicts a graph of measured system displacement and applied current, in accordance with embodiments of the present invention.

If the actuator 12 is moving at the time the waveform/current request is applied as current to the actuator 12 (i.e. during movement towards a desired position from a previously calculated current request in response to a user-desired change of position), then the waveform module 131 may ramp the actuator at a constant velocity in accordance with the waveform, resulting in receiving a displacement measurement signal from the displacement sensor 10 and a load measurement signal from the load sensor 20. The load measurement signal may be a time sample, showing that a force is applied, and the displacement signal may be a time sample, showing that a displacement of actuator 12 has occurred. FIG. 3C depicts a graph of measured system displacement (mm) and applied current (A), in accordance with embodiments of the present invention. Computing system 120 may analyze the data received by the waveform module 131 from the sensor 10 (e.g. displacement measurement signal) and using a data analysis technique, such as a least square fit, calculate a slope 230 representing a stiffness or a compliance (1/stiffness) of the medium working against the actuator 12.

Figure 3D:
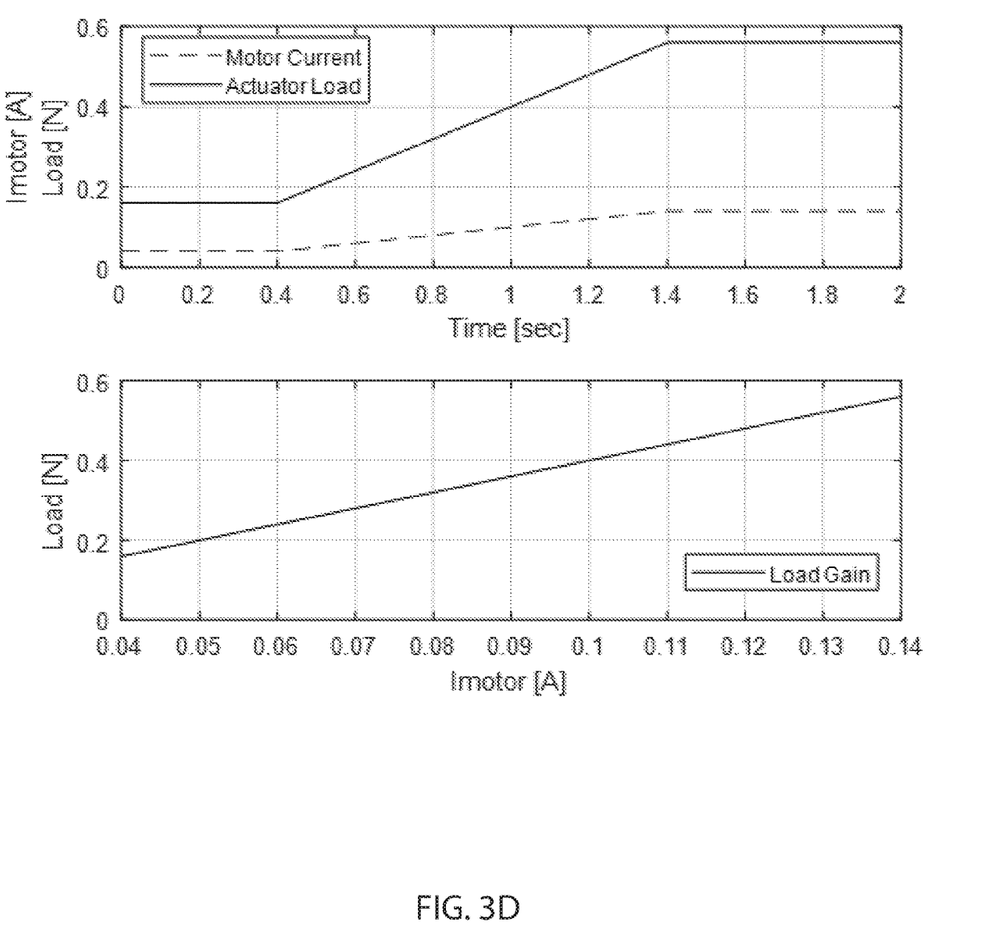
FIG. 3D depicts a graph of measured system load (N) and applied current (A), in accordance with embodiments of the present invention.

If the actuator 12 is moving at the time the waveform/current request is applied as current to the actuator 12 (i.e. during movement towards a desired position from a previously calculated current request in response to a user-desired change of load), then the waveform module 131 may ramp the actuator at a constant load ramp rate in accordance with the waveform, resulting in receiving a load measurement signal from the load sensor 20. The load measurement signal may be a time sample, showing that a force is applied. FIG. 3D depicts a graph of measured system load (N) and applied current (A), in accordance with embodiments of the present invention. Computing system 120 may analyze the data received by the waveform module 131 from the sensor 20 (e.g. load measurement signal) and using a data analysis technique, such as a least square fit, calculate a slope 230 representing a load gain.

Accordingly, embodiments of the waveform module 131 of the actuator control application 130 of computing system 120 coupled to mechanical testing system 50 may generate a waveform to obtain stiffness characterization data of a medium working against the actuator 12. Obtaining the characterization data from the sensor data may be performed each time the waveform is generated, for each update period.

Referring back to FIG. 1, embodiments of the computing system 120 may further include a comparing module 132. Embodiments of the comparing module 132 may include one or more components of hardware and/or software program code for determining a position error or load error by comparing a desired position of the actuator 12 input by a user operating the mechanical testing system with an actual position or load of the actuator 12. For instance, embodiments of the comparing module 132 may receive a user-input request for the actuator to be moved to a desired position to facilitate a "utility move" of the actuator 12 to prepare for a test or remove a specimen, and the like. In an exemplary embodiment, the user may input a desired displacement of 3 mm, which may be referred to as a desired position. Embodiments of the comparing module 132 may determine an actual position or a current position of the actuator 12 at a time of receiving the user input request for a change in actuator position to a desired position. Having both the desired actuator position and an actual or current actuator position, the comparing module 132 may compare or otherwise evaluate a difference between the desired position and the actual measured position of the actuator 12, or vice versa, to determine a position error. Accordingly, embodiments of the comparing module 132 may determine a position error, which may be represent an error or difference between the desired position as requested by the user and the actual or current position of the actuator 12.

Referring still to FIG. 1, embodiments of the computing system 120 may also include a calculating module 133. Embodiments of the calculating module 133 may include one or more components of hardware and/or software program code for calculating a current request using the stiffness characterization data and the position error. For instance, embodiments of the calculating module 133 may utilize the position error and the stiffness characterization data of the medium to calculate a current request having an amplitude that may represent an electrical current applied to the actuator 12 for controllably moving the actuator 12 through the medium according to a predefined constant velocity. Embodiments of the calculating module 133 may thus utilize the stiffness value determined from applying the small waveform to characterize a stiffness of the medium to calculate a current request for moving the actuator in a uniform, smooth fashion (constant ramp rate or velocity), regardless of the medium (e.g. actuator will not move too fast if medium is soft, or move to slow if medium is stiff). In an exemplary embodiment, the current reference may be calculated by multiplying the stiffness value (e.g. N/mm or $I_{motor}$/m) and the position error (mm), to arrive at a reference current, which may correspond to a force because actuator motor force is generally proportional to current. The reference current calculated by the calculating module 133 may be an amplifier current adjustment to achieve movement to the desired position, while maintaining uniform velocity.

Similarly, embodiments of the calculating module 133 may utilize the load error and the force gain and the stiffness characterization data of the medium to calculate a current request having an amplitude that may represent an electrical current applied to the actuator 12 for controllably moving the actuator 12 through the medium according to a predefined constant load ramp rate. Embodiments of the calculating module 133 may thus utilize the load gain value determined from applying the small waveform to characterize a load gain of the actuator to calculate a current request for moving the actuator in a uniform, smooth motion (constant load ramp rate), regardless of the medium (e.g. actuator will not apply too much force if the medium is soft, or apply too much force if medium is stiff). In an exemplary embodiment, the current reference may be calculated by multiplying the load gain value (e.g. $N/I_{motor}$) and the load/force error (N), to arrive at a reference current, which may correspond to a force because actuator motor force is generally proportional to current. The reference current calculated by the calculating module 133 may be an amplifier current adjustment to achieve adjustment of the load to the desired load, while maintaining uniform load ramp rate.

Embodiments of the computing system 120 may further include an actuator control module 134. Embodiments of the actuator control module 134 may include one or more components of hardware and/or software program code for controlling a movement of the actuator 12 using the current request to achieve the desired position while maintaining a uniform velocity. For instance, embodiments of the actuator control module 134 may effectuate the movement of the actuator 12 by utilizing the reference current needed to adjust the current supplied to the actuator 12 to ensure movement of the actuator 12 to the desired position remains within a predetermined ramp rate or displacement rate. The predetermined ramp rate and/or displacement rate of the actuator 12 may be set by the user using application 130, and/or may be a default setting from the manufacturer. Moreover, the predefined ramp rate and displacement rate of the actuator 12 may be dependent on the type of machine, the material to be tested, the size of the actuator, and the like.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the actuator control system 100 may improve mechanical testing technology by adaptively controlling a displacement of an actuator during pre-test and post-test operations, which can vary from test-to-test. For example, a user may request an actuator position change to create clearance for fastening a specimen to a fixture of the mechanical testing device 50. Instead of the actuator moving at a high velocity or in a jerking fashion (e.g. due to the actuator being in free air), the actuator will move at a constant velocity regardless of the medium, which will be appreciated by the user from a safety and predictability standpoint. Furthermore, the actuator control system 100 may improve the computing system 120 based on a set of rules that are applied to determine a reference current to control a physical displacement of an actuator according to predefined rates. As shown in FIGS. 3A-3D, rules are used to calculate and interpret various data received from physical sensor and hardware devices, testing a physical, real-world sample.

Figure 4:
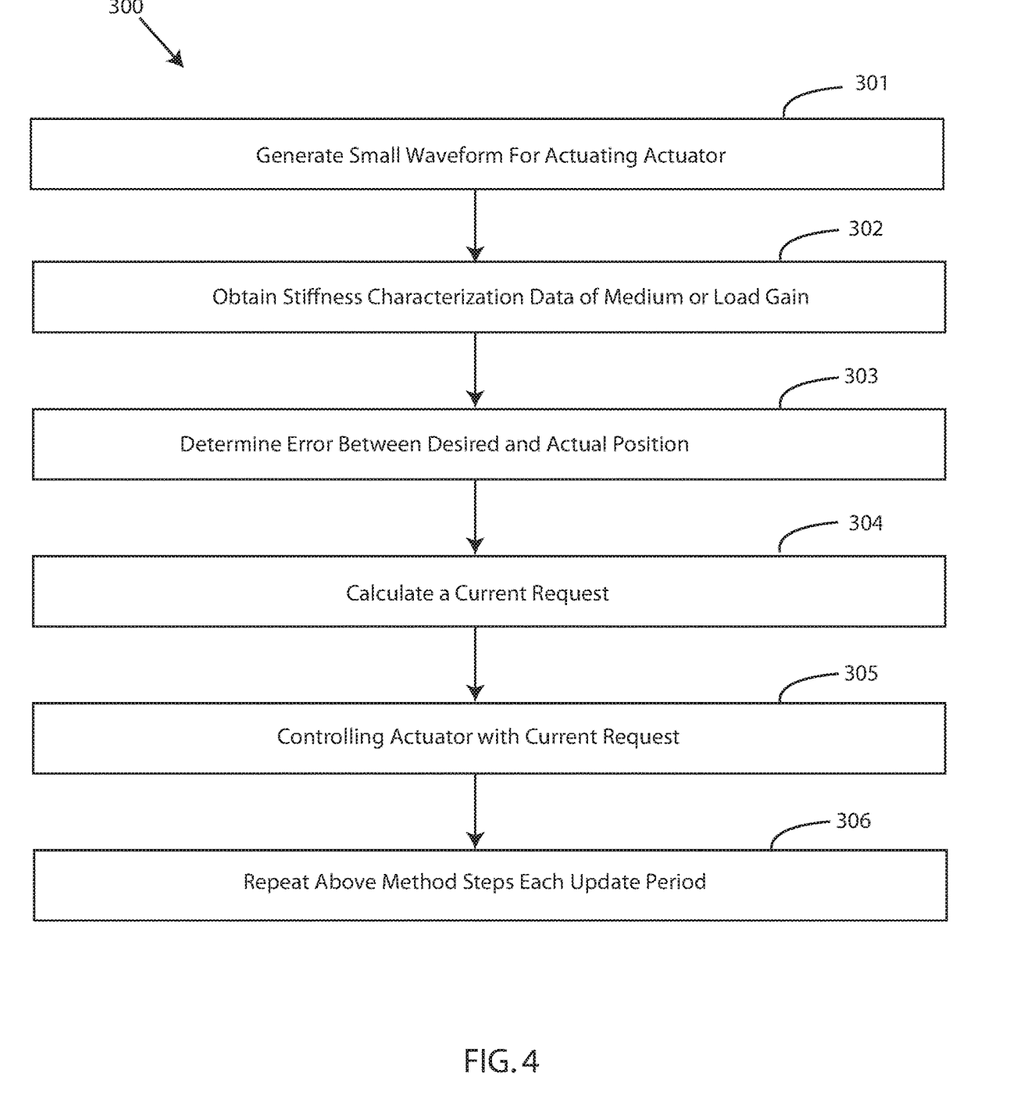
FIG. 4 depicts a flow chart of a method for adaptive control of an actuator of a mechanical testing device, in accordance with embodiments of the present invention.

Referring now to FIG. 4, which depicts a flow chart of a method 300 for adaptive control of an actuator 12 of a mechanical testing device 50, in accordance with embodiments of the present invention. One embodiment of a method 300 or algorithm that may be implemented for adaptive control of an actuator of a mechanical testing device with the actuator control system 100 described in FIGS. 1-3C using one or more computer systems as defined generically in FIG. 6 below, and more specifically by the specific embodiments of FIG. 1.

Embodiments of the method 300 for adaptive control of an actuator of a mechanical testing device, in accordance with embodiments of the present invention, may begin at step 301 wherein a small waveform is generated for actuating the actuator 12. Step 302 obtains a stiffness characterization data of medium working against the actuator, in response to the application of the waveform. Step 303 determines a position error between a desired actuator position and an actual actuator position. Step 304 calculates a current request using the stiffness characterization data. Step 305 controls a movement of the actuator with the current request, to perform an adjustment so that the current applied to the actuator results in a uniform, constant velocity of the actuator 12 as the actuator 12 moves into a desired position. Step 306 repeats steps 301-305 every update period at a given update rate (e.g. at least three times per second).

Figure 5:
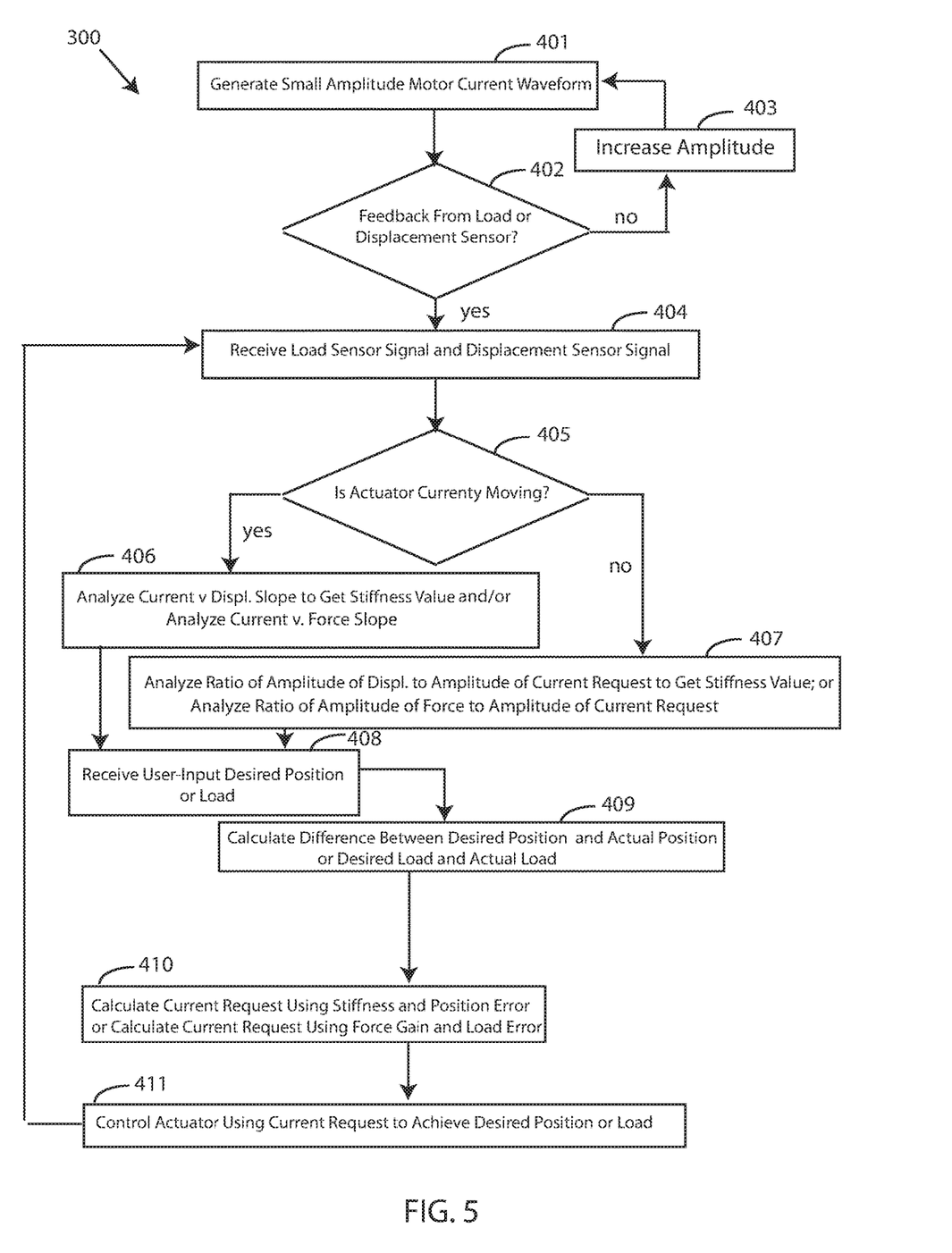
FIG. 5 depicts a detailed flow chart of the method for adaptive control of an actuator of a mechanical testing device of FIG. 4, in accordance with embodiments of the present invention

FIG. 5 depicts a detailed flow chart 400 of the method 300 for adaptive control of an actuator of a mechanical testing device of FIG. 4, in accordance with embodiments of the present invention. Step 401 generates a small amplitude motor current waveform. Step 402 determines whether feedback has been received from the load sensor 20 and/or displacement sensor 10. If no, then step 403 increases an amplitude of the motor current waveform. If yes, then step 404 receives the load sensor signal and/or the displacement sensor signal. Step 405 determines whether the actuator 12 is moving at the time of application of the waveform. If yes, step 406 analyzes a slope of the current and the displacement measurement signal to determine a stiffness of a medium working against the actuator 12, or analyzes a slope of the current and the force. If no, then step 407 analyzes a ratio of amplitude of displacement to an amplitude of the current request associated with waveform to determine stiffness value, or analyzes a ratio of amplitude of force to amplitude of current request. Both steps 406 and 407 lead to step 408, which receives a user-input desired position or load for the actuator 12. Step 409 calculates a difference between the desired position of the actuator and the actual position of the actuator, or calculates a difference between a desired load of the actuator and the actual load of the actuator. Step 410 calculates a current request using the stiffness data and the position error, or calculates a current request using force gain and load error. Step 411 then controls the actuator using the current request to achieve the desired position at a specified constant velocity, or load at a constant load ramp rate. The method may be return to step 404.

Figure 6:
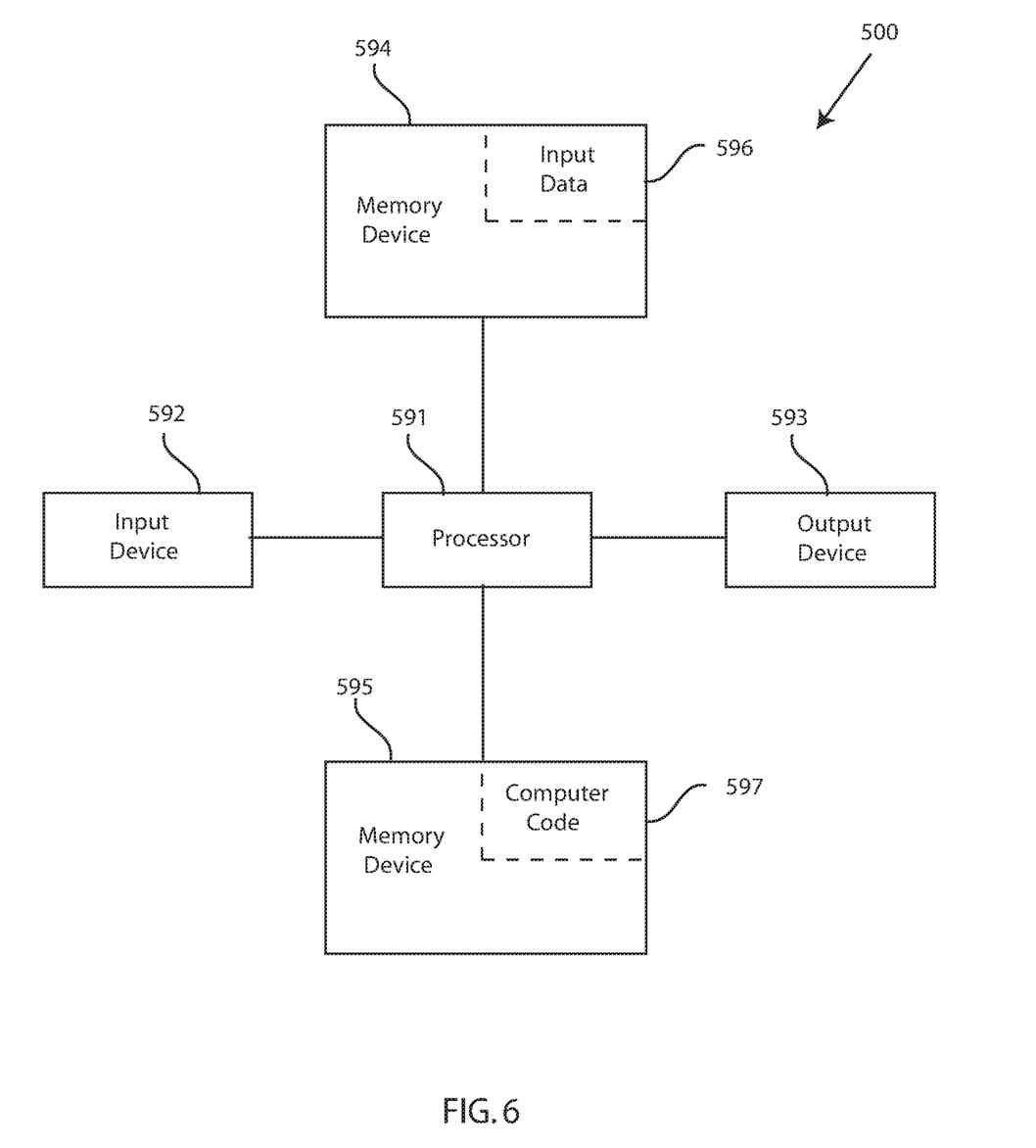
FIG. 6 depicts a block diagram of a computer system for the actuator control system of FIGS. 1-3C, capable of implementing for adaptive control of an actuator of a mechanical testing device of FIGS. 4-5, in accordance with embodiments of the present invention.

FIG. 6 depicts a block diagram of a computer system for the actuator control system 100 of FIGS. 1-3C, capable of implementing methods for adaptive control of an actuator of a mechanical testing device of FIGS. 4-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for adaptive control of an actuator of a mechanical testing device in the manner prescribed by the embodiments of FIGS. 4-5 using the actuator control system 100 of FIGS. 1-3C, wherein the instructions of the computer code 597 may be executed by processor 591 via memory device 595. The computer code 597 may include software or program instructions that may implement one or more algorithms for implementing the method for adaptive control of an actuator of a mechanical testing device, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to actuator control systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to adaptively control an actuator of a mechanical testing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for adaptive control of an actuator of a mechanical testing device. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for adaptive control of an actuator of a mechanical testing device.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for adaptive control of an actuator of a mechanical testing device, the method comprising:
generating an actuator current waveform to move an actuator, wherein the actuator current waveform is a periodic waveform;
moving an actuator through a medium in response to a first current request and the actuator current waveform;
determining a displacement of the actuator based on a displacement sensor signal;
determining a stiffness of the medium based on the displacement of the actuator;
determining a second current request based on the stiffness of the medium; and
moving the actuator through the medium according to a predefined constant velocity in response to the second current request and the current actuator waveform.

2. The method of claim 1, wherein the stiffness is at least one of: a ratio of a load amplitude to an amplitude of a current request associated with the waveform, a ratio of a displacement amplitude to an amplitude of the current request associated with the waveform, a gain equal to a slope of a force measured by the load sensor to the current request, or a slope of displacement measured by the displacement sensor and the current request, which are obtained by the load sensor signal and the displacement sensor signal.

3. The method of claim 1, wherein the actuator current waveform is a signal carrier waveform having a frequency between 3 Hz and 10 Hz.

4. The method of claim 1, wherein the method is performed prior to or after a testing cycle to accommodate a utility adjustment of the mechanical testing device.

5. The method of claim 1, wherein the stiffness is periodically determined by generating the actuator current waveform at least 3 times per second.

6. The method of claim 1, wherein the current request is calculated by multiplying the stiffness of the medium and a position error, the position error being a difference between a desired position of the actuator and an actual position of the actuator.

7. The method of claim 6, wherein the desired position is input by a user using a mechanical testing system coupled to the mechanical testing device.

8. A method for adaptive control of an actuator of a mechanical testing device, the method comprising:
generating an actuator current waveform to move an actuator, wherein the actuator current waveform is a periodic waveform;
moving an actuator through a medium in response to a first current request and the actuator current waveform;
determining a load gain of the actuator based on a load sensor signal;
determining a stiffness of the medium based on the load gain of the actuator;
determining a second current request based on the stiffness of the medium; and
moving the actuator through the medium according to a predefined constant load ramp rate in response to the second current request and the current actuator waveform.

9. The method of claim 8, wherein the second current request is calculated by multiplying the load gain of the actuator and a load error, the load error being a difference between a desired load of the actuator and an actual load of the actuator.

10. A mechanical testing system comprising:
a mechanical testing device having an actuator, a load sensor and a displacement sensor; and
a computing system coupled to the mechanical testing device and having a processor, a memory device coupled to the processor, and a computer readable storage device coupled to the processor;
wherein the computer readable storage device contains program code executable by the processor via the memory device to implement a method for adaptive control of an actuator of a mechanical testing device, the method comprising:
generating, by the processor, an actuator current waveform to move the actuator;
controlling, by the processor, a movement of the actuator through a medium in response to a first current request and the actuator current waveform;
determining, by the processor, a position error by comparing a desired position of the actuator with an actual position of the actuator, and a load error by comparing a desired load of the actuator with an actual load of the actuator;
calculating, by the processor, a stiffness of the medium based on at least one of the position error and the load error;
calculating, by the processor, a second current request using the determined stiffness of the medium, the position error, and the load error; and
controlling, by the processor, the movement and the actual load of the actuator using the second current request to achieve the desired position and desired load while maintaining both a uniform velocity and uniform load ramp rate.

11. The mechanical testing system of claim 10, wherein the actuator current waveform is generated multiple times over an update period to repeatedly determine the stiffness of the medium and the load gain of the actuator.

12. The mechanical testing system of claim 10, wherein the waveform is a signal carrier waveform having a frequency between 3 Hz and 10 Hz.

13. The mechanical testing system of claim 10, wherein the stiffness is at least one of: a ratio of a load amplitude to an amplitude of a current request associated with the waveform, a ratio of a displacement amplitude to an amplitude of the current request associated with the waveform, a gain equal to a slope of a force measured by the load sensor to the current request, or a slope of displacement measured by the displacement sensor and the current request, which are obtained by the load sensor signal and the displacement sensor signal.

14. The mechanical testing system of claim 10, wherein the method is performed prior to or after a testing cycle to accommodate a utility adjustment of the mechanical testing device.

15. The mechanical testing system of claim 10, wherein the second current request is calculated by multiplying the stiffness of the medium and the position error and by multiplying the load gain of the actuator and the load error.

* * * * *